United States Patent [19]

Saitoh et al.

[11] 4,353,132

[45] Oct. 5, 1982

[54] DOUBLE SUPERHETERODYNE TUNER

[75] Inventors: Takeshi Saitoh; Toshio Nagashima, both of Yokohama; Hiroshi Hatashita, Tokyo; Susumu Yamamoto, Yokohama, all of Japan

[73] Assignee: Hitachi, Ltd., Tokyo, Japan

[21] Appl. No.: 226,826

[22] Filed: Jan. 21, 1981

[30] Foreign Application Priority Data

Jan. 28, 1980 [JP] Japan .................................. 55-7827

[51] Int. Cl.³ ............................................. H04B 1/26

[52] U.S. Cl. ................................... 455/315; 455/327

[58] Field of Search ............... 455/315, 317, 325, 327, 455/300-302

[56] References Cited

U.S. PATENT DOCUMENTS 3,611,153 10/1971 Wen .................................. 455/327

3,939,429 2/1976 Lohn et al. ........................ 455/327

4,214,212 7/1980 Dipietromaria .................... 455/315

*Primary Examiner*—Jin F. Ng

*Attorney, Agent, or Firm*—Antonelli, Terry & Wands

[57] ABSTRACT

A double superheterodyne tuner including a first and a second frequency converter and a bandpass filter, constituted of microstrip lines, wherein the substrate in which the bandpass filter is built is disposed back to back with the substrates in which the first and second frequency converters are constructed, with the substrate for the bandpass filter extending over the first and second frequency converters, so that a sufficient high-frequency isolation of circuit elements can be effected by the use of smaller shielding plates, the overall size can be reduced and a uniform grounded condition can be obtained.

3 Claims, 7 Drawing Figures

DOUBLE SUPERHETERODYNE TUNER

BACKGROUND OF THE INVENTION

1. Field of the Invention

This invention relates to a double superheterodyne tuner for use in a television receiver set or an FM stereophonic receiver set, and more particularly to a double superheterodyne tuner of up-conversion type using a microstrip circuit.

2. Description of the Prior Art

Tuners may be classified into two types; single superheterodyne tuners and double superheterodyne tuners. In the past, single superheterodyne tuners have been widely used.

With the recent development of UHF circuit technology, however, the so-called up-conversion type superheterodyne reception system, in which the frequency of the first IF signal is always chosen to be higher than that of the received signal, has been increasingly adopted. This tendency is due to the merits; an excellent characteristic for rejection of interference (e.g. image and IF interference); a capability of covering a wide frequency range easily without change-over of bands; and feasibility of adjustment for every channel of a TV tuner.

In such an up-conversion type superheterodyne reception system, since the frequency of the first IF signal is rather higher than that of the received signal, the image interference with respect to the first mixer is almost negligible and only the image interference with respect to the second mixer has to be taken into consideration. The degree of the appreciable interference depends largely on the filtering characteristics of the bandpass filters used. In order to improve the image ratio, therefore, the bandpass filters to be used must be so designed as to provide a sufficient attenuation outside a desired range of frequencies.

Moreover, in the UHF region, even bandpass filter having an ideal attenuation characteristic will be useless if there is even a very slight electromagnetic coupling between the input and output sides of the filter. Namely, the choice of filter characteristic is not all that is required, but the electromagnetic coupling between the input and output sides of the filter must be eliminated to a satisfactory extent. In the tuner described above, therefore, the bandpass filter should be separated in the sense of high frequency interference from other circuits and securely grounded.

However, the conventional tuner structure has a drawback that it requires numerous shield plates to provide secure high-frequency separations and also a drawback that the size of the tuner is rather large and cannot be reduced.

Further, since the contact surface between the substrates of circuit elements and the chassis is rather large, it is difficult to maintain a uniform grounded condition. This leads to an additional drawback that a desired characteristic cannot be obtained.

SUMMARY OF THE INVENTION

One of the main objects of this invention is to provide a double superheterodyne tuner which is free from the drawbacks of the conventional tuner of the same sort, which can provide sufficient high-frequency separations by the use of smaller shielding plates, whose size is small enough, and in which a uniform grounded condition can be easily obtained.

This invention, which has been made to obtain the above object of this invention, is featured by the structure in which a substrate with a bandpass filter constructed therein is disposed back to back with a substrate with a first and second frequency converting section therein, the substrate with the bandpass filter therein extending over the first and second frequency converting sections.

DESCRIPTION OF THE PREFERRED EMBODIMENT

For a better understanding of this invention, the structure of a conventional double superheterodyne tuner will first be described.

Figure 1:
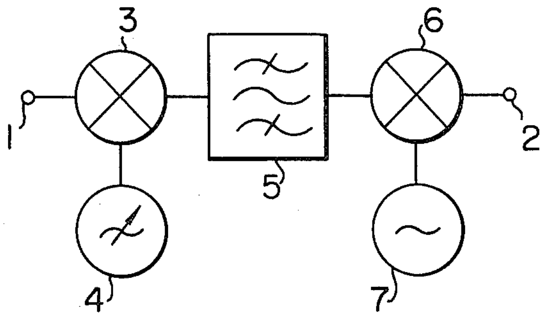
FIG. 1 shows a block diagram for illustrating a general structure of a double superheterodyne tuner of up-conversion type.

FIG. 1 shows a block diagram for illustrating a general structure of an up-conversion type double superheterodyne tuner.

In FIG. 1, reference numeral 1 indicates an input terminal for a high frequency signal (e.g. 50–900 MHz) received by, for example, an antenna; 2 an output terminal for an IF signal; 3 a first mixer; 4 a first local oscillator; 5 a bandpass filter having a predetermined band width; 6 a second mixer; and 7 a second local oscillator. The output of the first mixer 3 is a so-called first IF signal. In the up-conversion system, the oscillation frequency of the first local oscillator 4 is so chosen such that the frequency of the first IF signal may be higher than the highest one of the frequencies of the signals received at the input terminal 1. For example, when the received signal has a frequency within a range of 50–900 MHz, the oscillation frequency of the first local oscillator 4 is made variable over a range of 3650–4500 MHz or 2700–3550 MHz, so as to obtain a first IF signal having a frequency four times as high as the maximum input frequency, i.e. 3600 MHz.

The first IF signal, delivered from the first mixer 3, is sent through the bandpass filter 5 having a center frequency of 3600 MHz so that the portion of the first IF signal outside the desired frequency band is attenuated. The output of the bandpass filter 5 is supplied to the second mixer 6 and mixed there for frequency conversion with the local oscillation frequency of the second local oscillator 7. As a result, an IF signal having a frequency of 36–57 MHz (i.e. 36 MHz in Europe, 44 MHz in U.S.A., and 57 MHz in Japan) can be obtained from the output terminal 2.

Accordingly, just as described before, image interference in the first mixer 3 is almost negligible and that in the second mixer 3 alone makes an appreciable problem. In order to improve the image ratio, therefore, it is necessary for the bandpass filter 5 to provide sufficient attenuation (e.g. at least 70 dB) for the input signal thereto outside the desired frequency band.

Namely, the signal causing an image interference in the second mixer 6 has a frequency higher or lower by double the frequency of the IF signal (derived at the output terminal 2) than the first IF signal of 3600 MHz. For example, in the case of an IF signal of 44 MHz, the bandpass filter 5 must attenuate the signal of 3688 MHz or 3512 MHz to an extent of not less than about 70 dB.

Figure 3:
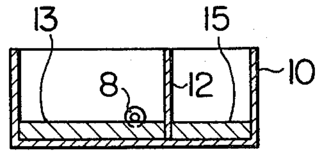
FIG. 3 is a cross section taken along line III—III in FIG. 2.
Figure 2:
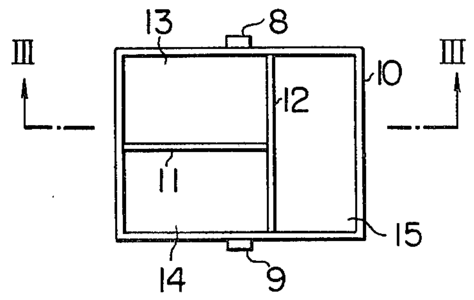
FIG. 2 shows in a front view a conventional double superheterodyne tuner.

For this purpose, a typical double superheterodyne tuner used in the past has such a structure as shown in FIGS. 2 and 3.

In FIG. 2, reference numeral 8 indicates an input connector, corresponding in function to the input terminal 1 shown in FIG. 1; 9 an output connector, corresponding in function to the output terminal 2; 10 a chassis serving also as a casing; 11 and 12 shielding plates; 13 a first frequency converter substrate including the first mixer 3 and the first local oscillator 4 in FIG. 1; 14 a second frequency converter substrate including the second mixer 6 and the second local oscillator 7 in FIG. 1; and 15 a bandpass filter substrate corresponding in function to the bandpass filter 5. These substrates 13, 14 and 15 are all constituted of microstrip lines and the shielding plates 11 and 12 are sufficiently kept in mechanical and electrical contact with each other and with the chassis 10.

With this structure described above, since the bandpass filter substrate 15 is in close contact with the chassis 10, a sufficient grounded condition can be attained and also since it is shielded from the first and second frequency converter substrates 13 and 14 by the shielding plate 12, the substrate 15 is sufficiently separated in the sense of high frequency interference from the substrates 13 and 14. Accordingly, the bandpass filter substrate 15 can attain a desired narrow passband and a sufficient attenuation ability outside this passband.

However, in the conventional double superheterodyne tuner described above, the first and second frequency converter substrates and the bandpass filter substrate are disposed in a two-dimensional arrangement so that numerous shielding plates are needed to assure high-frequency isolation between them. In addition, there is a drawback, as mentioned before, that the overall size cannot be reduced. Moreover, since the area in which those substrates are in contact with the chassis, is large, then it is difficult to obtain a uniform grounded condition. This leads to a drawback that the image ratio degrades especially in UHF region due to relative bandwidth.

Accordingly, as described above, according to this invention, the substrate in which the bandpass filter is constructed is arranged back to back with the substrates in which the first and the second frequency converter are built respectively, the bandpass filter substrate extending over the first and second frequency converters, so that the high frequency isolation between the input and output sides of the bandpass filter is improved and also that the grounded area is reduced, whereby the image ratio is improved.

Now, this invention will be described by way of embodiment with the aid of the attached drawings.

Figure 4:
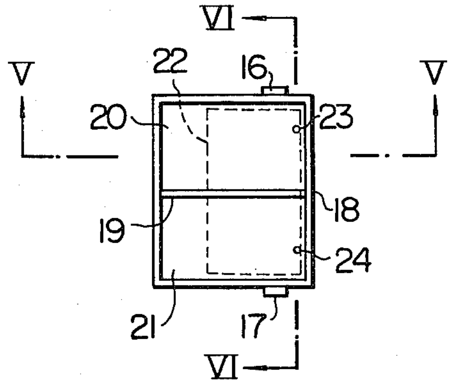
FIG. 4 shows in a front view a double superheterodyne tuner as an embodiment of this invention.
Figure 5:
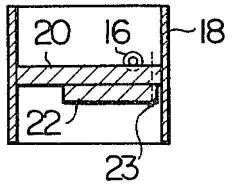
FIG. 5 is a cross section taken along line V—V in FIG. 4.

FIG. 4 shows in front view an embodiment of this invention and FIG. 5 is a cross section taken along line V—V in FIG. 4. In FIG. 4, reference numeral 16 designates a connector equivalent to the input connector 8 shown in FIGS. 2 and 3. The connector 16 is therefore referred to simply as the input connector. Numeral 17 designates a connector which is hereafter referred to as the output connector; 18 a chassis equivalent to the chassis 10 in the conventional tuner; 19 a shielding plate equivalent to the shielding plate 11 in the conventional tuner; 20 and 21 a first and a second frequency converter substrate corresponding the above described substrates 13 and 14, respectively; 22 a bandpass filter substrate corresponding to the substrate 15 of the conventional tuner; 23 a conductor rod serving as the input terminal of the bandpass filter; and 24 a conductor rod serving as the output terminal of the bandpass filter. In the substrates 20, 21 and 22, the first and the second frequency converter and the bandpass filter are all constituted of microstrip lines. These circuit components are similar to those used in the conventional tuner.

The first and the second frequency converter substrate 20 and 21 are juxtaposed face up in a plane in the chassis 18 (in FIG. 4, perpendicular to and on this side of the sheet of the drawing) and the shielding plate 19 is interposed between the substrates 20 and 21. The shielding plate 19 has its ends kept in direct contact with the inner surface of the chassis 18 and is securely connected mechanically and electrically with the chassis 18. The bandpass filter substrate 22 is inserted face down in the chassis 18 (in FIG. 4, perpendicular to and the opposite side of the sheet of the drawing) and arranged back to back with and extending over the first and the second substrate 20 and 21, with its grounding conductor kept in direct contact with the grounding conductors of the substrates 20 and 21.

The transfer of signal between the first frequency converter substrate 20 and the bandpass filter substrate 22 takes place through the conductor rod 23 as the input terminal and the signal transfer between the bandpass filter substrate 22 and the second frequency converter substrate 21 is through the conductor rod 24 as the output terminal.

In the tuner embodying this invention, since the bandpass filter substrate 22 is disposed back to back with the first and the second frequency converter substrate 20 and 21 in the chassis 18, the grounding conductors of the substrates 20 and 21 serve as shielding plates. Accordingly, without any special shielding plate between the substrates 20 and 21 and the substrate 22, a satisfactory shielding effect can be obtained, hence a secure high frequency isolation. The size in plan is smaller by the size of the bandpass filter substrate 22 than the conventional tuner and therefore the reduction of the overall size becomes possible. Moreover, since the area in which the grounding conductors of the substrates 20, 21 and 22 are in contact with the chassis 18 is small so that there is no risk of the characteristics becoming unstable due to the uneven grounded condition. This is one of the effects which cannot be expected of the prior art tuner configuration.

Figure 6:
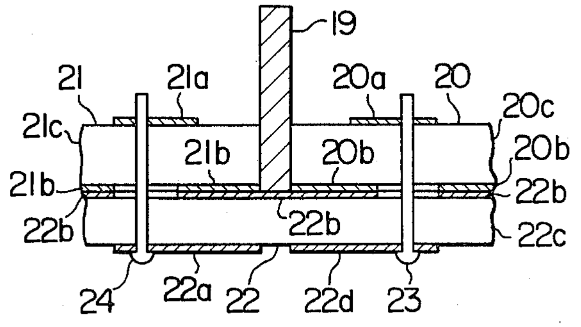
FIG. 6 shows, in a cross section as taken along line VI—VI in FIG. 4, on an enlarged scale the main portion of a double superheterodyne tuner as another embodiment of this invention.

FIG. 6 shows in cross section corresponding to that taken along line VI—VI in FIG. 4, a tuner as an embodiment of this invention, especially the joining portions between the substrates 20-22 and the shielding plate 19 and the signal transfer paths consisting mainly of the conductor rods 23 and 24. In FIG. 6, reference symbol **20*a* indicates an output line of conductor in the first frequency converter; 20*b* its grounding conductor; 21*a* an input line of conductor in the second frequency converter; 21*b* its grounding conductor; 22*a* and 22*b* output and input lines of conductor in the bandpass filter; and 20c, 21c and 22c the dielectric bodies of the substrates 20–22**, respectively.

In this embodiment, the first and the second frequency converter substrate 20 and 21 abut against the shielding plate 19 on both the sides thereof and the end of the shielding plate 19 is kept in contact with the grounding conductor 22b of the bandpass filter 22, so that the mechanical and elecrical contact of the shielding plate 19 with the respective grounding conductors 20b, 21b and 22b may be completely established. The conductor rods 23 and 24 serving as the input and output terminals of the bandpass filter extend passing through the dielectric bodies (20c and 22c ) and (21c and 22c ) to establish conducting paths between the output line conductor 20a and the input line conductor 22d and between the output line conductor 22a and the input line conductor 21a. Those portions, having a predetermined shape, of the grounding conductors 20b, 21b and 22b which the conductor rods 23 and 24 penetrate and which lie around the rods, are removed to provide the conductor rods 23 and 24 with desired characteristic impendances.

Accordingly, in the embodiment shown in FIG. 6, the shielding plate 19 is electrically connected with the grounding conductors 20b, 21b and 22b of the substrates 20, 21 and 22 so that the shielding effect by the shielding plate 19 is remarkable enough to provide a stable operation. Consequently, there can be obtained a tuner having excellent characteristics.

Figure 7:
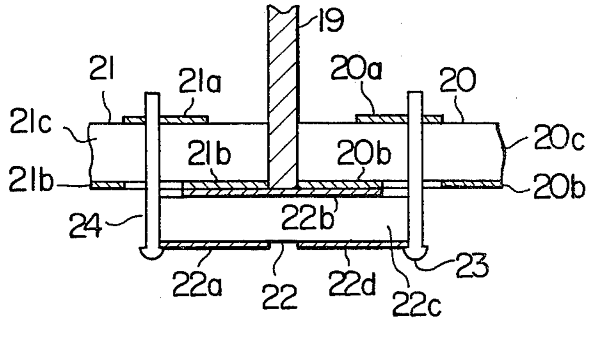
FIG. 7 shows in cross section the main portion of still another embodiment of this invention.

FIG. 7 shows in cross section corresponding to that taken along line VI—VI in FIG. 4, a tuner as another embodiment of this invention, especially the joining portion between the substrates 20–22 and the shielding plate 19 and the signal transfer paths that are the conductor rods 23 and 24. Equivalent parts in FIGS. 5 and 6 are indicated by the same reference numerals.

In this embodiment, the conductor rods 23 and 24 do not penetrate the bandpass filter substrate 22 and the bandpass filter substrate 22 is so cut as to have a width equal to the distance between the conductor rods 23 and 24. The input and output line conductors 22a and 22b of the bandpass filter are electrically connected with the conductor rods 23 and 24. This embodiment has the same effect as the embodiment shown in FIG. 6.

In the above embodiments, the first and second frequency converter substrates 20 and 21 are separately provided, but they may be integrally formed as a single substrate while the shielding plate 19 is either disposed at a predetermined position of the surface of the substrate or inserted at its end into a groove which is formed at the predetermined portion of the substrate.

As described above, according to this invention, all the drawbacks of the conventional tuner can be eliminated by simply rearranging the respective substrates. Thus, the number of the shielding plates to be used can be reduced, the size and the weight of the resulting product can be decreased, and complete electric shielding between substrates can be attained so that a double superheterodyne tuner of up-conversion type, in which high-frequency isolation is satisfactorily secured and therefore which has excellent characteristics, can be provided at a low cost.

We claim:

1. A double superheterodyne tuner including a first and a second frequency converter and a bandpass filter connecting said first and second frequency converters electrically each of which is built on a substrate constituted by microstrip lines comprising line conductors provided on one main surface of a flat dielectric plate and grounding conductors provided on the other surface of said flat dielectric plate, wherein the improvement comprises: means for juxtaposing a first and second microstrip line substrates in which said first and second frequency converters are respectively built, with said line conductors of said first and second substrates disposed on the same side, with said grounding conductors of said first and second substrates disposed on the same side and in a plane; a shielding plate provided between and perpendicularly to said first and second substrates; and means for arranging a third microstrip line substrate in which said bandpass filter is constructed, back to back with said first and second substrates, with the grounding conductor of said third substrate kept in contact with said grounding conductors of said first and second substrates and with said third substrate extending over said first and second substrates, whereby high-frequency isolation of each circuit element can be securely established.

2. A double superheterodyne tuner according to claim 1, comprising conductor rods for connecting signals between said first frequency converter and said bandpass filter and between said bandpass filter and said second frequency converter, said conductor rods penetrating the ground conductors associated substrates almost perpendicularly in corresponding junction portions and these portions, having a predetermined shape, of said grounding conductors which said conductor rods penetrate and which lie around said rods, are removed to leave predetermined gaps between said rods and said grounding conductors.

3. A double superheteodyne tuner according to claim 1, comprising conductor rods for connecting signals between said first frequency converter and said bandpass filter and between said bandpass filter and said second frequency converter, said conductor rods penetrating the ground conductors of said first and second substrates almost perpendicularly in associated junction portions, said bandpass filter having a width equal to the distance between said rods and connected with said rods, wherein those portions of said grounding conductors, having predetermined shapes, which said rods penetrate and which lie around said rods are removed to leave predetermined gaps between said rods and said grounding conductors.

* * * * *